April 12, 1966 R. L. KOPERNAK 3,245,598
VACUUM DESOLDERING IRON
Original Filed Oct. 9, 1961
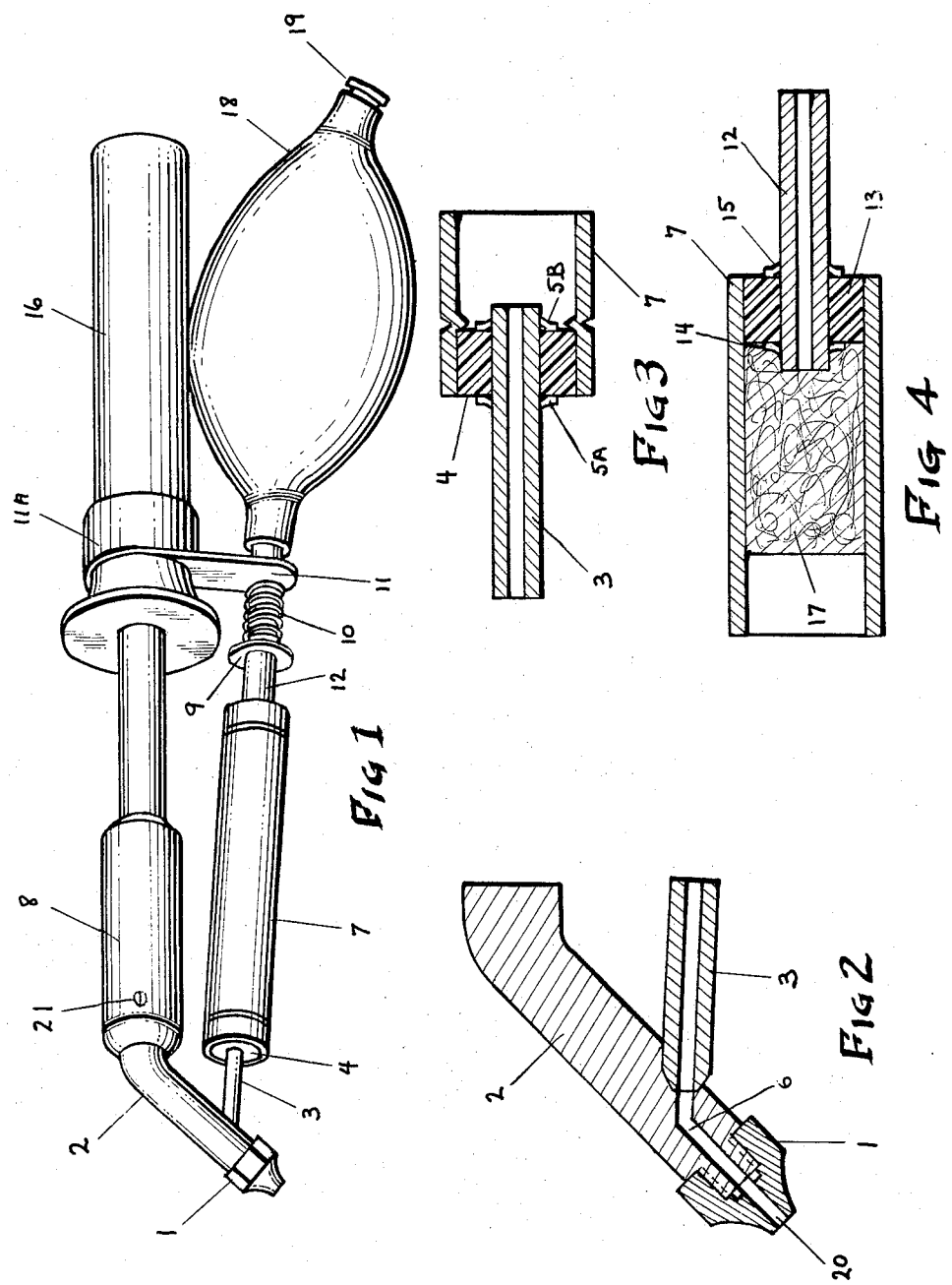
INVENTOR.
Rudy L. Kopernak

United States Patent Office 3,245,598
Patented Apr. 12, 1966

3,245,598
VACUUM DESOLDERING IRON
Rudy L. Kopernak, 6222 Park Ave., Indianapolis, Ind.
Continuation of application Ser. No. 143,853, Oct. 9, 1961. This application Dec. 16, 1963, Ser. No. 332,332
4 Claims. (Cl. 228—20)

This invention relates to a vacuum desoldering device and more particularly to the use of vacuum and heat for removing solder in desoldering connections. This application is a continuation of my co-pending application, Serial No. 143,853, filed October 9, 1961, and entitled Vacuum Desoldering Iron, and now abandoned.

It is the object of the present invention to provide a device for removing old solder or excess solder from printed circuits or soldered connections.

Another object of the present invention is to provide a device that performs the complete removal of the melted solder without attachments.

A further object of the present invention is to perform the desoldering process without excessive heating of the connection or area around the connection.

A further object of the present invention is to provide a means of cooling the desoldered connection by the rush of air caused by the vacuum while removing unwanted solder.

A further object of the present invention is to provide a means of desoldering and a removal process for unwanted solder thus quickly cleaning connections for testing and replacing parts in circuits.

A further object of the present invention is to provide a device to reduce time consumed by service men, repairmen, or assembly men in removing parts having soldered connections for testing or replacing purposes.

A further object of the present invention is to provide a device which can be used as a standard soldering iron.

A further object of this invention is to provide a means of carrying molten solder to hollow pin connections.

A further object of the present invention is to provide a means of soldering pin connections by applying heat around their circumference.

Still a further object of the present invention is to provide a vacuum desoldering iron which can be produced, packaged, and sold in large quantities at a comparatively low cost, and which can be conveniently utilized wherever needed.

The full nature of the invention will be understood from the accompanying drawings and the following description and claims.

FIG. 1 is a perspective view of soldering iron, vacuumized filter chamber, heating tip body, vacuum source and handle, made in accordance with present invention.

FIG. 2 is a detailed cross section side view of heat tip body, aperture for removal of solder through removable heat tip, tube to vacuum chamber.

FIG. 3 is a cross sectional side view of front end of vacuum filter chamber with tube from heat tip body passing through air seal.

FIG. 4 is shown rear end of vacuum filter chamber with filter, rear end air seal with rear vacuum connecting tube.

Referring now specifically to FIG. 1, a drawing of a vacuum desoldering device 1, made in accordance with the present invention, is shown to include a conventional heat controlled heating element 8 with handle 16, a removable tip body 2, a vacuumized filter chamber 7, a spring 10, and a vacuum source 18.

Heating element 8 is attached to tip body 2 at an angle to permit vacuumized filter chamber 7 to be mounted parallel to heating element 8. Vacuumized filter chamber 7 is connected to tip body 2 by connecting tube 3 and to vacuum source 18 by connecting tube 12. Connecting tube 3 passes through insulating air seal 4 and is secured by locking devices 5A and 5B in end of vacuumized filter chamber 7.

Connecting tube 12 passes through insulating air seal 13 and is secured by locking devices 14 and 15. Connecting tube 12 passes through spring 10 and through bracket 11 and is attached to vacuum source 18.

The hollow vacuum connecting tube 3 is so mounted as to allow sufficient heat to be maintained in the tube to allow molten solder pulled through aperture 20 to be drawn by vacuum into vacuumized filter chamber 7.

Molten solder is deposited and cooled in vacuumized filter chamber 7.

Spring device 10 permits vacuumized filter chamber 7 to be released by moving the chamber away from the tip body, thus sliding it back off the air seal 4, for removing collected solder and for replacing filter material.

The vacuum chamber 7 is removable if desired for emptying and filter 17 cleaning by releasing it as indicated above, and then sliding it forward off air seal 13. The vacuum system and heating head and tip are designed to fit on conventional soldering irons of the design shown in FIG. 1.

The operation of this device will now be readily understood. The soldering iron (as shown in FIG. 1) is plugged into an electric outlet and allowed to thoroughly heat the tip body 2, tip 1, and vacuum connecting tube 3. Before placing the aperture of tip 1 on the connection to be desoldered, compress vacuum bulb 18 between thumb and first three fingers. Now place aperture of tip 1 on connection to be desoldered and hold until solder is melted. When solder is melted, release vacuum bulb 18. Releasing vacuum bulb 18 creates a vacuum through connecting tube 12, through filter material 17, through vacuumized filter chamber 7, through connecting tube 3, through opening in tip body 2, and through aperture of tip 1. Suction created by the release of vacuum bulb 18 carries the molten solder from the connection to be desoldered, through the aperture of tip 1, through the opening of tip body 2, through connecting tube 3, and into vacuumized filter chamber 7 where molten solder is deposited, filter material 17 prevents cooled solder from entering connecting tube 12 and allows air into vacuum bulb 18.

Thus, the solder has been removed from the connection to be desoldered and is ready to be removed for testing or for replacement. This device, without application of the vacuum, may be used as a conventional soldering iron to resolder the connection. Moreover, the aperture of tip 1 is particularly suitable for placing over protruding connections on printed circuit boards for resoldering these connections.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A soldering and desoldering device comprising: a handle; a heating element mounted to said handle and supported thereby; a tip body mounted to said heating element and heated thereby and having a passageway therein; a tip on said tip body and heated thereby and having an aperture therein communicating with said passageway; a thermally conductive tube joined to said tip body and heated thereby and communicating with said passageway; a hollow solder receiver having one end received on and supported by said tube, said tube communicating with the interior of said receiver, said one end of said receiver being slidably mounted to said tube to facilitate removal from said tube; a spring supported by said handle and resiliently retaining said receiver in supported position on said tube and a source of vacuum mounted adjacent said handle and communicating with the interior of said receiver and establishing a vacuum in said receiver and said tube and said passageway for picking up solder when melted by said tip, said aperture having an open end through which the melted solder may be drawn.

2. A soldering and desoldering device comprising: an elongated handle; a heating element mounted to said handle and supported thereby; a tip body removably mounted to said heating element and having a passageway therein; a tip removably mounted on said tip body and having an aperture therein communicating with said passageway; a thermally conductive tube joined to said tip body and heated thereby and communicating with said passageway; an elongate hollow rigid nonporous solder receiver disposed generally parallel to said handle and adjacent said heating element and having a forward end supported by said tube, said receiver being thermally insulated from said tube, said tube communicating with the interior of said receiver; a second tube mounted to said handle and extending generally parallel to and forwardly of said handle and supporting a rear end of said receiver and communicating with the interior of said receiver; and a hollow flexible bulb connected to said second tube and secured by said second tube in a position immediately adjacent said handle, with said second tube communicating with the interior of said bulb, whereby the handle and bulb are grippable simultaneously in an operator's hand for first collapsing said bulb and then allowing said bulb to expand to induce a flow through said aperture, said passageway, said tubes, and the interior of said receiver, said aperture having an open end through which flow may be produced, and the entire exterior surface of said bulb being exposed external to said handle whereby said bulb is engageable by and collapsible between the thumb and first three fingers of an operator's hand, and said receiver and said second tube and said bulb being movable unitarily in a direction generally parallel to said handle and away from said tip body to facilitate removal of said receiver from said first tube for cleaning.

3. A device as set forth in claim 2 wherein said receiver is axially slidable on said tubes to facilitate removal of said receiver from said device.

4. A soldering and desoldering device comprising: a handle; a heating element mounted to said handle and supported thereby; tip means connected to said heating element and having a passageway therein; a thermally conductive tube joined to said tip means and heated thereby and communicating with said passageway; a hollow solder receiver having a front portion received on and supported by said tube, said tube communicating with the interior of said receiver; and a hollow flexible bulb connector means mounted on said handle and supporting the rear portion of said receiver and securing said bulb in position adjacent said handle, said bulb being coupled to said receiver with communication between the interior of said receiver and the interior of said bulb, said handle and said bulb being grippable simultaneously in an operator's hand for first collapsing said bulb and then allowing said bulb to expand to induce a flow through said passageway, said tube and the interior of said receiver, said passageway having an open end through which flow may be produced, and the entire exterior surface of said bulb being exposed external to said handle whereby said bulb is engageable by and collapsible between the thumb and at least one finger of an operator's hand.

References Cited by the Examiner

UNITED STATES PATENTS

| 559,511 | 5/1896 | Burns et al. | 219—26 |
| 571,970 | 11/1896 | Harvey | 128—401 |
| 944,254 | 12/1909 | Binford | 32—70 |
| 1,026,611 | 5/1912 | Shoenberg | 219—39.3 |
| 1,937,294 | 11/1933 | Post | 219—39.3 |
| 2,609,778 | 9/1952 | Bleam | 219—26 |
| 2,955,188 | 10/1960 | Campo | 219—26 |

FOREIGN PATENTS

| 181,042 | 6/1922 | Great Britain. |
| 693,197 | 6/1953 | Great Britain. |

WHITMORE A. WILTZ, *Primary Examiner.*

ANTHONY BARTIS, *Examiner.*